United States Patent
Mese et al.

(10) Patent No.: US 10,228,952 B2
(45) Date of Patent: *Mar. 12, 2019

(54) SYSTEM AND METHOD FOR ACCELERATED BOOT PERFORMANCE

(71) Applicant: Lenovo (Singapore) Pte. Ltd., Singapore (SG)

(72) Inventors: John Carl Mese, Cary, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 193 days.

This patent is subject to a terminal disclaimer.

(21) Appl. No.: 14/679,571

(22) Filed: Apr. 6, 2015

(65) Prior Publication Data

US 2015/0212827 A1 Jul. 30, 2015

Related U.S. Application Data

(63) Continuation of application No. 13/097,911, filed on Apr. 29, 2011, now Pat. No. 9,003,175.

(51) Int. Cl.
*G06F 9/4401* (2018.01)

(52) U.S. Cl.
CPC .................. *G06F 9/4401* (2013.01)

(58) Field of Classification Search
None
See application file for complete search history.

(56) References Cited

U.S. PATENT DOCUMENTS

| 5,991,822 | A  | * | 11/1999 | Mealey | G06F 13/102 713/1 |
|---|---|---|---|---|---|
| 8,225,009 | B1 | * | 7/2012 | Nayak | G06F 3/0607 710/15 |
| 8,453,049 | B1 | * | 5/2013 | Grieve | G06F 9/45529 715/234 |
| 9,003,175 | B2 | * | 4/2015 | Mese | G06F 9/4401 713/1 |
| 2006/0277402 | A1 | * | 12/2006 | Wakabayashi | G06F 9/445 713/1 |
| 2006/0293891 | A1 | * | 12/2006 | Pathuel | G06F 21/32 704/246 |
| 2008/0072028 | A1 | * | 3/2008 | Allison | G06F 9/4418 713/1 |
| 2009/0013212 | A1 | * | 1/2009 | Lyster | G06F 11/1402 714/6.3 |

* cited by examiner

*Primary Examiner* — Paul Yen
(74) *Attorney, Agent, or Firm* — Ference & Associates LLC

(57) ABSTRACT

Systems, methods and products are described that provide accelerated boot performance. One embodiment provides a method including: initiating a booting process of a user operating system of a computer system, wherein the operating system sets a plurality of hardware devices for inclusion in the booting process; identifying a non-critical hardware device in the plurality of hardware devices set for start up according to the user operating system; excluding the non-critical hardware device from the booting process; completing the booting process to provide an operational user operating system to a user without starting an excluded non-critical hardware device; and thereafter loading and initializing the excluded non-critical hardware device as a post-boot task. Other embodiments are described and claimed.

16 Claims, 5 Drawing Sheets

SYSTEM AND METHOD FOR ACCELERATED BOOT PERFORMANCE

This application is a continuation application of U.S. patent application Ser. No. 13/097,911, entitled SYSTEM AND METHOD FOR ACCELERATED BOOT PERFORMANCE, filed on Apr. 29, 2011, the contents of which are incorporated by reference entirely herein.

BACKGROUND

Booting is the process that loads and provides a user operating system (OS), such as a version of MICROSOFT WINDOWS OS, when the user turns on a computer system. The boot sequence is the initial set of operations performed responsive to power on that prepares the user OS for use, including loading the user OS from persistent storage. In this booting process, a boot program is executed to access the memory device(s) from which the OS and related data are loaded, and part of the booting process includes making checks to determine which hardware devices of the computer system are available.

The complexity of the boot process leads to a significant amount of time taken to boot up such that a user can operate the user OS. A lengthy boot process can be undesirable. Several computer systems are available that provide for a quicker boot experience, but these usually are only suitable for beginning a limited OS capable of simple tasks, such as providing Internet access. Various approaches have been taken to speed up the booting process for a full user OS, including for example pre-fetching and caching certain files.

BRIEF SUMMARY

In summary, one aspect provides a method comprising: initiating a booting process of a user operating system of a computer system, wherein the operating system sets a plurality of hardware devices for inclusion in the booting process; identifying a non-critical hardware device in the plurality of hardware devices set for start up according to the user operating system; excluding the non-critical hardware device from the booting process; completing the booting process to provide an operational user operating system to a user without starting an excluded non-critical hardware device; and thereafter loading and initializing the excluded non-critical hardware device as a post-boot task.

Another aspect provides a system comprising: one or more processors; and a memory in operative connection with the one or more processors; wherein, responsive to execution of computer program instructions accessible to the one or more processors, the one or more processors: initiate a booting process of a user operating system of a computer system, wherein the operating system sets a plurality of hardware devices for inclusion in the booting process; identify a non-critical hardware device in the plurality of hardware devices set for start up according to the user operating system; exclude the non-critical hardware device from the booting process; complete the booting process to provide an operational user operating system to a user without starting an excluded non-critical hardware device; and thereafter load and initialize the excluded non-critical hardware device as a post-boot task.

A further aspect provides a computer program product comprising: a computer readable storage device having computer readable program code embodied therewith, the computer readable program code being executable by a processor and comprising: computer readable program code that initiates a booting process of a user operating system of a computer system, wherein the operating system sets a plurality of hardware devices for inclusion in the booting process; computer readable program code that identifies a non-critical hardware device in the plurality of hardware devices set for start up according to the user operating system; computer readable program code that excludes the non-critical hardware device from the booting process; computer readable program code that completes the booting process to provide an operational user operating system to a user without starting an excluded non-critical hardware device; and computer readable program code that thereafter loads and initializes the excluded non-critical hardware device as a post-boot task.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
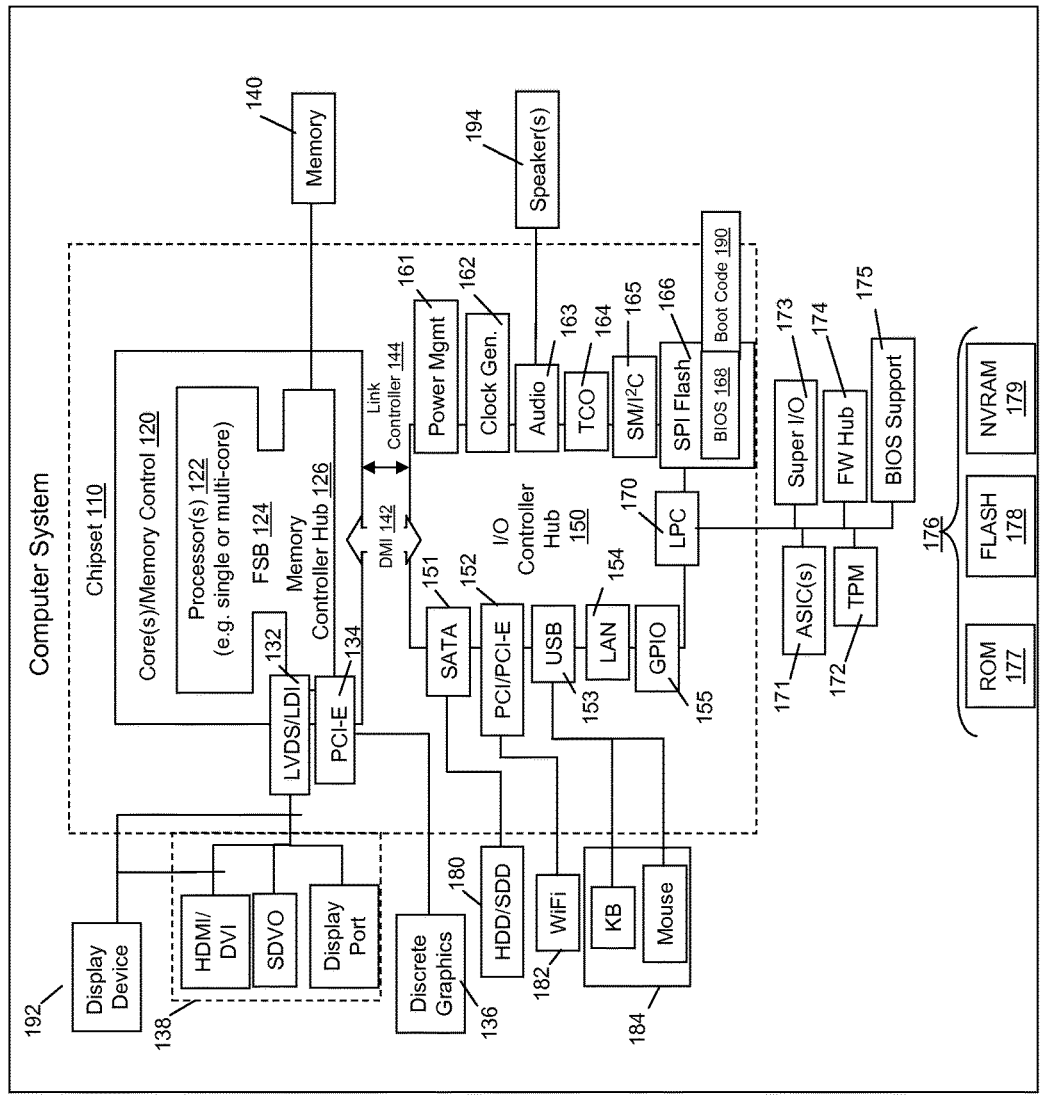
FIG. 1 illustrates an example circuitry of a computer system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obscuring aspects of the invention.

Using a single WINDOWS OS installed on a computing system as a non-limiting example, a typical booting process, which begins at power on of the computer system and ends when the user can log on at a logon dialog box, includes the following. When the computer system is turned on (power on), BIOS controls the computer system to initially to perform various booting operations. A set of these operations includes the Power On Self Test (POST) processing, which determines an amount of memory available and checks the hardware devices (such as a keyboard) available on the computer system.

In a legacy BIOS/MBR (master boot record) configuration (noting that other configurations may also be utilized, for example a Unified Extensible Firmware Interface (UEFI)/GUID Partition Table (GPT) configuration, et cetera), when BIOS completes it check, it loads the MBR program into memory. Once the MBR is loaded, it controls the booting process. The MBR executes code in the first sector of the disk (MBR), finds the active partition, and passes control to the active partition's boot record (PBR). The PBR code initiates the user OS in a manner defined by the user OS and locates specific boot files for execution and initialization of the remainder of the user OS.

A boot loader program detects components (such as computer ID, video, keyboard, communication ports, parallel ports, mouse/pointing device(s)) and typically loads low level device drivers (for example, a hard disk device driver) into memory. Other device drivers are then loaded and initialized during kernel initialization by the low-level device drivers already loaded, and the session manager thereafter starts the higher-order subsystems and services for the user OS. In the case of a WINDOWS OS, a subsystem then starts, which brings up the logon dialog box, finishing the booting process.

Therefore, during the booting process a lot of operations are typically performed in order to prepare the user OS for use. This tends to create a bottleneck in that the system resources (processor(s), memory, and/or I/O) are constrained during the booting process, such that operations must wait to be completed. Some software elements may be pre-fetched into a cache to provide quicker access to the software elements for quicker booting. Prefetching to a cache provides some improvement, as it reduces the time necessary to retrieve software elements by making pre-fetched software elements more readily available when they are needed. However, this technique only has limited impact because it does not address the fact that the system resources are typically over-loaded during booting by the large amount of components that need to be handled only some of which are critical, which is a prime cause of extended boot time. Another approach takes aim at decreasing I/O load by prioritizing certain software elements to be loaded during boot up. This tends to reduce the boot time somewhat, but does not fully address the bottlenecking issue encountered because typically a large number of processes continue to occupy system resources. This approach is also limited in that it only considers components with high I/O costs. Thus, further reduction in boot time is desirable.

An embodiment facilitates faster booting (reduced boot time) by proactively disabling certain, non-critical hardware device(s) and certain, non-critical software element(s) such that these do not need to be handled during the booting process. Therefore, these disabled hardware device(s) and/or software element(s) do not contribute to the bottleneck at the system resources at boot time. An embodiment provides that these non-critical hardware device(s) and/or non-critical software element(s) (which may be software element(s) related to non-critical hardware device(s), such as directly related software element(s) such as device driver(s), or indirectly related software element(s) such as security services such as a firewall indirectly related to the loading of a networking device, or may include other software element(s) not related to non-critical hardware device(s), such as OS components and/or proprietary software, for example keyboard noise suppression, on-screen display graphics management software for volume/brightness, et cetera) may thereafter be enabled and made available, after booting has been completed. Additionally, the delayed items may be started more quickly (after boot completion) because resources are more available.

Thus, an embodiment allows for reducing overall boot time by reducing the number of device(s) and/or element(s) that are handled in the booting process. This allows the computing system to shift the burden of loading and initializing certain system components to a later time, when resources are not as burdened. The result is to provide a user with a booted system more quickly than has been previously realized, while not materially impacting the nature of the user OS, such that the user is presented with a "full" user OS experience, as the typical user has come to expect.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C. However, as is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more user operating systems (OSs) and application software (for example, stored in system memory 140). A user OS may be stored in any of a variety of locations and accessed, for example, according to instructions of the BIOS 168. As described herein, a device may include fewer or more features than shown in the system of FIG. 1.

Figure 2:
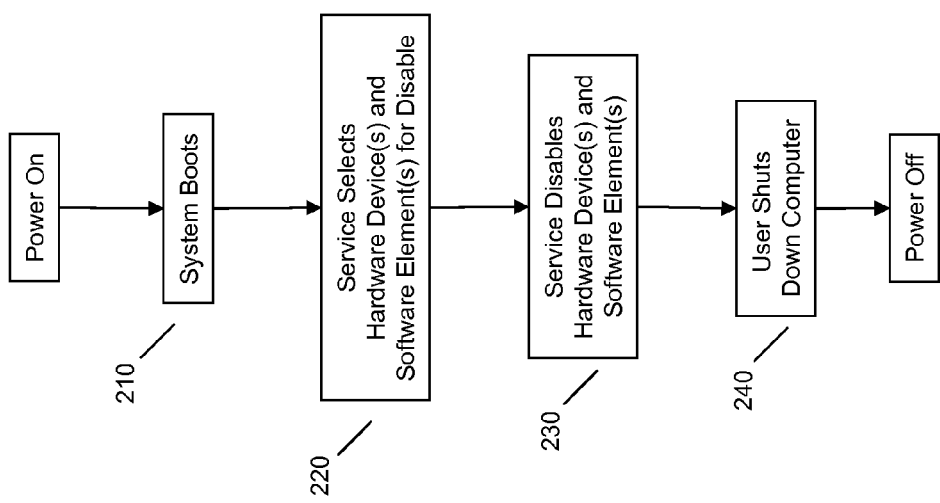
FIG. 2 illustrates an example of selecting elements for disablement/exclusion from the booting process.

Referring to FIG. 2, an embodiment selectively disables hardware device(s) and/or software element(s) that are non-critical from a booting perspective. This allows for decreasing boot time and providing a booted user OS in a shorter amount of time as compared with conventional implementations. For example, responsive to power on of a computer system, the system begins to boot 210 the user OS. An embodiment provides a service that selects hardware device(s) and/or software element(s) to disable to provide for more rapid booting 220. This service may run at various times, for example during the booting process itself, as a background service while the computer system is running (under control of the user OS), just prior to system shut down/power off, et cetera. Once the hardware device(s) and/or software element(s) have been selected, the service disables these 230 such that they are excluded from the booting process, such as selecting them and setting them to disable prior to shut down of the computer system 240.

Figure 3:
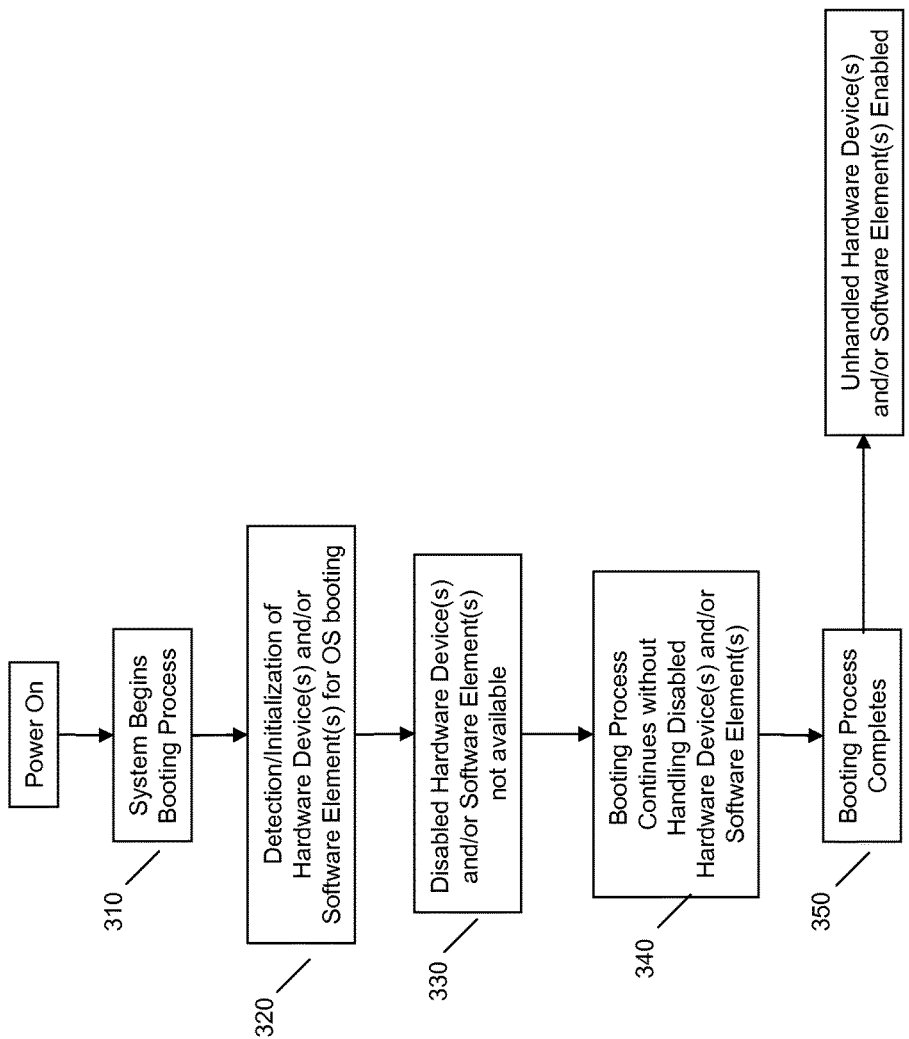
FIG. 3 illustrates an example of a simplified booting process.

Referring to FIG. 3, having the service select and set certain hardware device(s) to disable and/or select and set certain software element(s) to be excluded from the booting process, an embodiment provides for reduced boot time. For example, responsive to power on of a computer system, the computer system beings the booting process as normal 310. During booting, the computer system detects/enumerates hardware devices available and related software elements (for example, device drivers) that are to be loaded and initialized. However, instead of simply loading and initializing all the hardware device(s) and/or software element(s) pre-set by the user OS to be auto-loaded and started, an embodiment disables certain hardware device(s) and/or software element(s) such that these are excluded from the booting process 330. For example, audio is not required to boot a system. An embodiment may thus disable audio device(s) along with associated OS software components at shutdown. When the system is booted, the affected audio components are not started, thereby decreasing the amount of tasks for boot to complete. These may be started once the system has booted the user OS. Thus, the booting process is simplified from the perspective of resource utilization, as these hardware device(s) and/or software element(s) are precluded from starting during the boot up of the user OS, and thus need not be loaded, initialized et cetera, which frees up system resources to focus on more critical boot components. Therefore, the booting process may continue 340 while handling fewer components and thus complete 350 more rapidly.

In implementing the exclusion of hardware device(s) and/or software element(s), it may be helpful to identify dependencies between the hardware device(s) and/or software element(s), as well as taking into consideration any sequencing of the disablement and/or enablement operations in such a way as to optimize load time, while ensuring post-boot functionality identical or similar to a computer system in which exclusion has not been implemented (a system having a stock user OS). Thus, the selection of which hardware device(s) and/or software element(s) to be disabled/excluded from the booting process may vary based on a variety of factors.

In one example, an embodiment provides a service that selects non-critical booting components for disablement/exclusion automatically. Non-critical components are defined as those components not necessary for successful completion of the booting process of a full user OS experience; whereas critical components are necessary for a successful booting of a full user OS experience. Critical components would thus include, by way of example, devices and/or software required for booting of the user OS, such as a hard disk device and related drivers. Critical components may be further refined to include features that, while not necessarily essential to loading of the user OS, are required for proper use of the computer system, such as enabling video for visual display capabilities and/or enabling a biometric device for biometric input/logon during the booting process. Thus, the critical components are needed to provide a full user OS from the user's perspective.

Non-critical components include those components that permit non-critical features of the computer system to be enabled at boot completion. Some non-limiting examples include audio devices and related drivers, external devices (devices connected to the USB, such as an integral camera) and related drivers, networking devices (such as Ethernet/WiFi components) and related drivers, biometric devices and related drivers, firewalls and other security software, proprietary software, et cetera. The categorization of hardware device(s) and/or software element(s) as critical or non-critical in the context used herein may be predefined, may vary, and/or may be determined dynamically.

Figure 4:
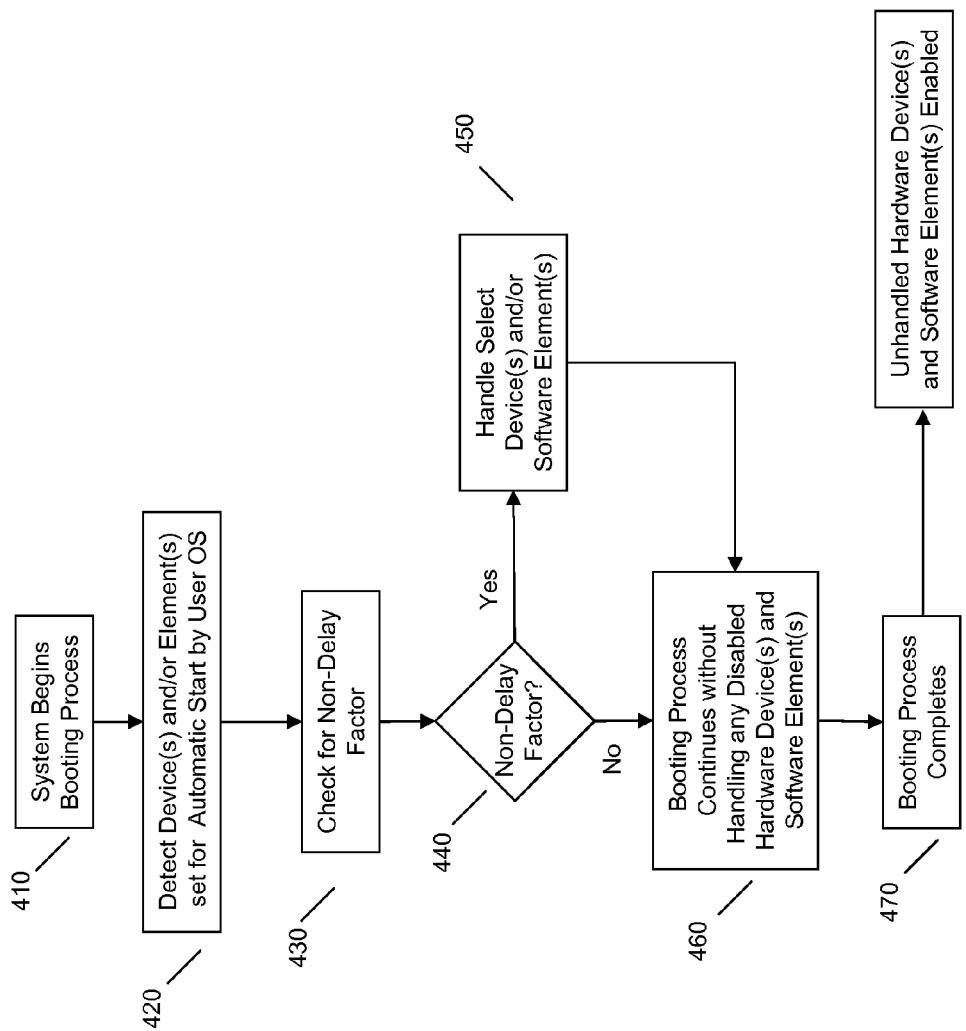
FIG. 4 illustrates an example of dynamically determining elements for disablement/exclusion from the booting process.

By way of example, referring to FIG. 4, an embodiment is able to dynamically determine if a hardware device and/or software element is critical or non-critical in a given context. When the system begins the booting process 410, the service control manager or a component of the user OS may detect 420 devices and/or software element(s) set for automatic start by the user OS, as is usual. Responsive to this enumeration of device(s)/element(s), an embodiment may check 430 for a non-delay factor, for example a security token associated with a user account of the system (such as password or biometric device protection). A non-delay factor may also include a determination that inclusion of (handling) a particular device/software element in the booting process would not delay booting time (that is, there are sufficient resources available for handling the device/software element during boot). If a non-delay factor is identified 430, for example a device related to a security token, even if typically non-critical, this device may be deemed critical in this case and turned on 450.

For example, if a user has established a security token for the computer system requiring biometric input through a fingerprint reader, an embodiment detects this and enables the fingerprint reader and related software elements such that these can be loaded and initialized during the booting process, even if the service may normally categorize these as non-critical. Responsive to such check 440, the booting process may continue without handling any other non-critical hardware device(s) and/or software elements, as described herein, and the booting process may be completed 470. Thus, the critical devices/software elements dynamically identified (fingerprint reader, a software element/device that will not delay booting, et cetera) are made available by completion of the booting process, even if the service may typically (by default) set the device/element to disable as being non-critical.

Figure 5:
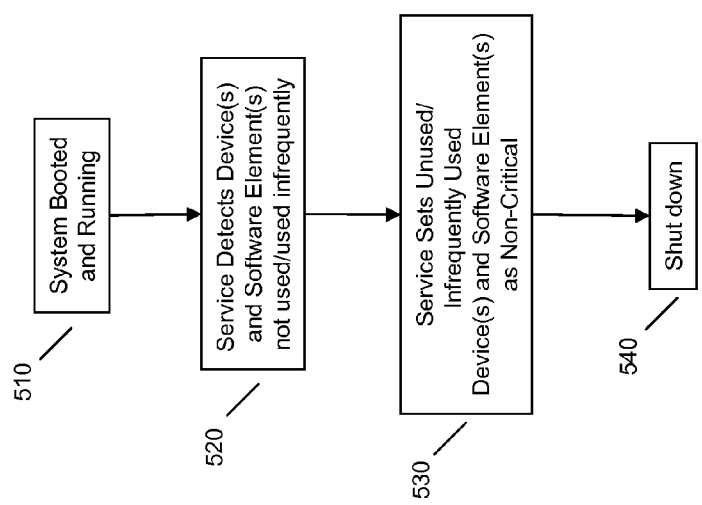
FIG. 5 illustrates an example of dynamically determining elements for disablement/exclusion from the booting process.

Referring to FIG. 5, the determination of hardware device(s) and/or software element(s) to list as non-critical/critical may be determined using intelligence or via user selection. For example, while the computer system is running 510, the service may collect information regarding unused or infrequently used hardware device(s) and/or software element(s) by a particular user such that these hardware device(s)/software element(s) can be detected 520. Once detected, the service may set these to disable/exclude these from the booting process 530 such that at shut down 540, these will be selected as non-critical and thus will not be started/loaded/initialized when the system is re-booted. This will reduce booting time by avoiding unnecessary handling of such infrequently/non-used components during the booting process.

It will be readily understood that embodiments may be implemented in one or more computing devices configured appropriately to execute program instructions consistent with the functionality of the embodiments as described herein. In this regard, FIG. 1 describes a non-limiting example of such a computing device. Embodiments may be implemented using a variety of computing systems, such as desktops, workstations, servers, slates, tablets, and the like.

As will be appreciated by one skilled in the art, various aspects may be embodied as a system, method or computer program product. Accordingly, aspects may take the form of an entirely hardware embodiment or an embodiment including software and/or hardware aspects that may all generally be referred to herein as a "circuit," "module" or "system." Furthermore, aspects may take the form of a computer program product embodied in one or more computer readable medium(s) having computer readable program code embodied therewith.

Any combination of one or more non-signal computer readable medium(s) may be utilized. A non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying drawings, it is to be understood that this description is not limiting and that various other changes and modifications may be affected therein by one skilled in the art without departing from the scope or spirit of the disclosure.

What is claimed is:

1. A method comprising:

initiating a booting process of a user operating system of a computer system, wherein the user operating system sets a plurality of hardware devices for inclusion in the booting process of the user operating system;

during the booting process occurring after power on of the computer system, identifying at least one non-critical hardware device in the plurality of hardware devices set for inclusion in the booting process by the user operating system, wherein a non-critical hardware device comprises a hardware device not necessary for successful completion of the booting process of the user operating system, wherein the identifying at least one hardware device as non-critical comprises determining a hardware device as not being associated with a security token associated with a user account of the user operating system;

thereafter excluding the at least one non-critical hardware device and one or more software elements dependent on the at least one non-critical hardware device from the booting process;

completing the booting process to provide an operational user operating system to a user without loading and initializing the at least one excluded non-critical hardware device; and thereafter loading and initializing the at least one excluded non-critical hardware device as a post-boot task.

2. The method of claim 1, further comprising:

identifying at least one non-critical software element set for inclusion in the booting process according to the user operating system; and excluding the at least one non-critical software element set for inclusion in the booting process according to the user operating system.

3. The method according to claim 2, further comprising:

responsive to completing the booting process, starting one or more of: an excluded non-critical hardware device set for inclusion in the booting process according to the user operating system, and an excluded non-critical software element set for inclusion in the booting process according to the user operating system.

4. The method according to claim 1, wherein said excluding comprises setting the at least one non-critical hardware device to a disabled state.

5. The method according to claim 4, wherein the at least one non-critical hardware device includes one or more of a biometric device, an audio device, a device connected to a USB of the computer system, and a network connection device.

6. The method according to claim 2, wherein the at least one non-critical software element is directly or indirectly related to said at least one non-critical hardware device.

7. The method according to claim 2, wherein said identifying further comprises dynamically identifying at least one non-critical hardware device.

8. The method according to claim 7, wherein said dynamically identifying further comprises checking for a security token associated with a user account of the computer system.

9. The method according to claim 8, further comprising, responsive to identifying a security token associated with a user account of the computer system, starting a hardware device associated with said security token.

10. A system comprising:

one or more processors; and a memory in operative connection with the one or more processors;

wherein, responsive to execution of computer program instructions accessible to the one or more processors, the one or more processors:

initiate a booting process of a user operating system of a computer system, wherein the user operating system sets a plurality of hardware devices for inclusion in the booting process of the user operating system;

during the booting process occurring after power on of the computer system, identify at least one non-critical hardware device in the plurality of hardware devices set for inclusion in the booting process by the user operating system, wherein a non-critical hardware device comprises a hardware device not necessary for successful completion of the booting process of the user operating system, wherein the identifying at least one hardware device as non-critical comprises determining a hardware device as not being associated with a security token associated with a user account of the user operating system;

thereafter exclude the at least one non-critical hardware device and one or more software elements dependent on the at least one non-critical hardware device from the booting process;

complete the booting process to provide an operational user operating system to a user without loading and initializing the at least one excluded non-critical hardware device; and thereafter load and initialize the at least one excluded non-critical hardware device as a post-boot task.

11. The system of claim 10, wherein the one or more processors:

identify at least one non-critical software element set for inclusion in the booting process according to the user operating system; and exclude the at least one non-critical software element set for inclusion in the booting process according to the user operating system.

12. The system according to claim 11, wherein the one or more processors:

responsive to completing the booting process, start one or more of: an excluded non-critical hardware device set for inclusion in the booting process according to the user operating system, and an excluded non-critical software element set for inclusion in the booting process according to the user operating system.

13. The system according to claim 10, wherein to exclude comprises setting the at least one non-critical hardware device to a disabled state.

14. The system according to claim 11, wherein the at least one non-critical software element is directly or indirectly related to said at least one non-critical hardware device.

15. The system according to claim 11, wherein to identify further comprises dynamically identifying at least one non-critical hardware device.

16. A computer program product comprising:

a computer readable storage device having computer readable program code embodied therewith, the computer readable program code being executable by a processor and comprising:

computer readable program code that initiates a booting process of a user operating system of a computer system, wherein the user operating system sets a plurality of hardware devices for inclusion in the booting process of the operating system;

computer readable program code that, during the booting process occurring after power on of the computer system, identifies at least one non-critical hardware device in the plurality of hardware devices set for inclusion in the booting process by the user operating system, wherein a non-critical hardware device comprises a hardware device not necessary for successful completion of the booting process of the user operating system, wherein the identifying at least one hardware device as non-critical comprises determining a hardware device as not being associated with a security token associated with a user account of the user operating system;

computer readable program code that thereafter excludes the at least one non-critical hardware device and one or more software elements dependent on the at least one non-critical hardware device from the booting process;

computer readable program code that completes the booting process to provide an operational user operating system to a user without loading and initializing the at least one excluded non-critical hardware device; and
computer readable program code that thereafter loads and initializes the at least one excluded non-critical hardware device as a post-boot task.

\* \* \* \* \*